United States Patent
Stemplinger

(10) Patent No.: US 6,747,950 B1
(45) Date of Patent: Jun. 8, 2004

(54) METHOD OF ROUTING ASYNCHRONOUSLY TRANSFERRED MESSAGE CELLS WITH 100% LINE UTILIZATION

(75) Inventor: Robert Stemplinger, München (DE)

(73) Assignee: Siemens Aktiengesellschaft, Münich (DE)

( * ) Notice: Subject to any disclaimer, the term of this patent is extended or adjusted under 35 U.S.C. 154(b) by 0 days.

(21) Appl. No.: 09/297,435
(22) PCT Filed: Oct. 7, 1997
(86) PCT No.: PCT/DE97/02296
§ 371 (c)(1),
(2), (4) Date: Apr. 29, 1999
(87) PCT Pub. No.: WO98/19427
PCT Pub. Date: May 7, 1998

(30) Foreign Application Priority Data

Oct. 31, 1996 (DE) .......................................... 196 44 100

(51) Int. Cl.[7] .......................... H04L 12/26; H04L 12/56
(52) U.S. Cl. .................. 370/232; 370/395.42; 370/411; 370/252
(58) Field of Search ................................ 370/229–237, 370/411–420, 252, 395.4–395.43, 535–542

(56) References Cited

U.S. PATENT DOCUMENTS

| 5,533,009 A | | 7/1996 | Chen | |
| 5,629,928 A | * | 5/1997 | Calvignac et al. | 370/412 |
| 5,777,984 A | * | 7/1998 | Gun et al. | 370/230 |
| 5,787,071 A | * | 7/1998 | Basso et al. | 370/231 |
| 5,818,818 A | * | 10/1998 | Soumiya et al. | 370/412 |

FOREIGN PATENT DOCUMENTS

| EP | 0 734 195 A2 | 9/1996 |
| WO | WO 96/29805 | 9/1996 |

* cited by examiner

Primary Examiner—Steven H. D Nguyen
(74) Attorney, Agent, or Firm—Schiff Hardin LLP

(57) ABSTRACT

In a means for forwarding message cells transmitted according to the asynchronous transfer mode, the message cells of a plurality of blocks are supplied to an interface that supports back pressure of traffic. A 100% utilization of the interface is achieved in that a block only receives an authorization for forwarding a message cell when it has a message cell with payload data.

1 Claim, 4 Drawing Sheets

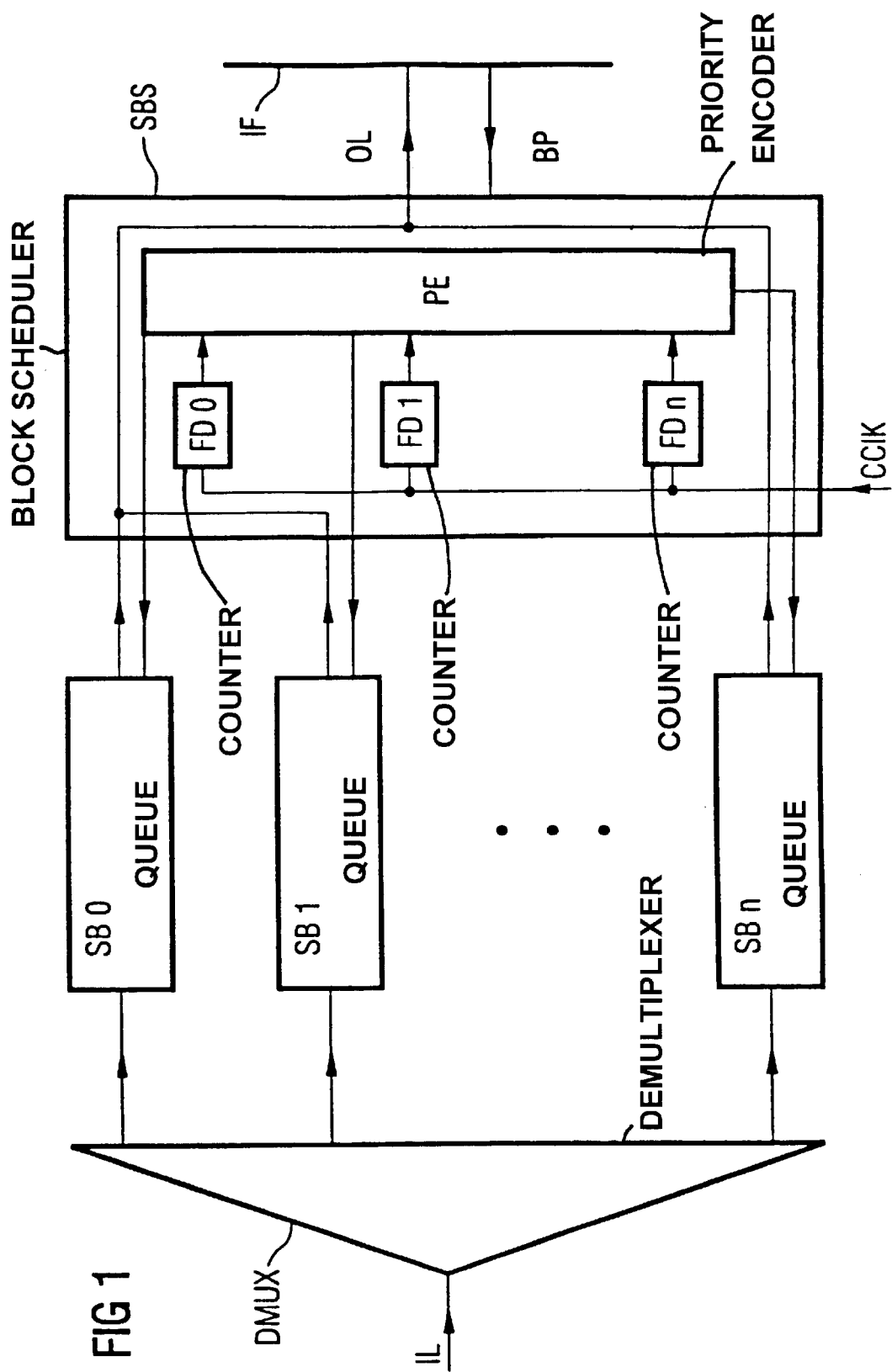

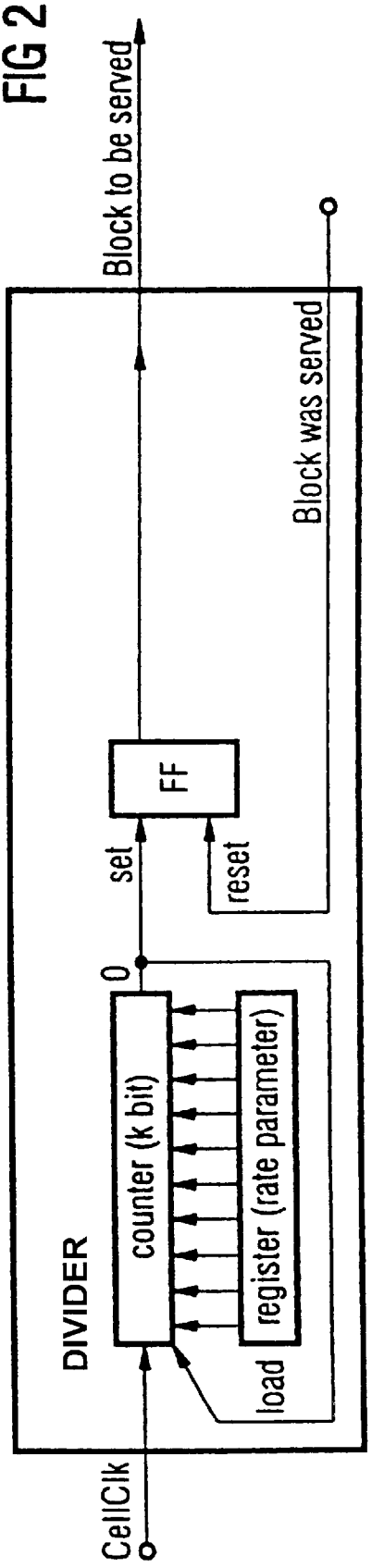
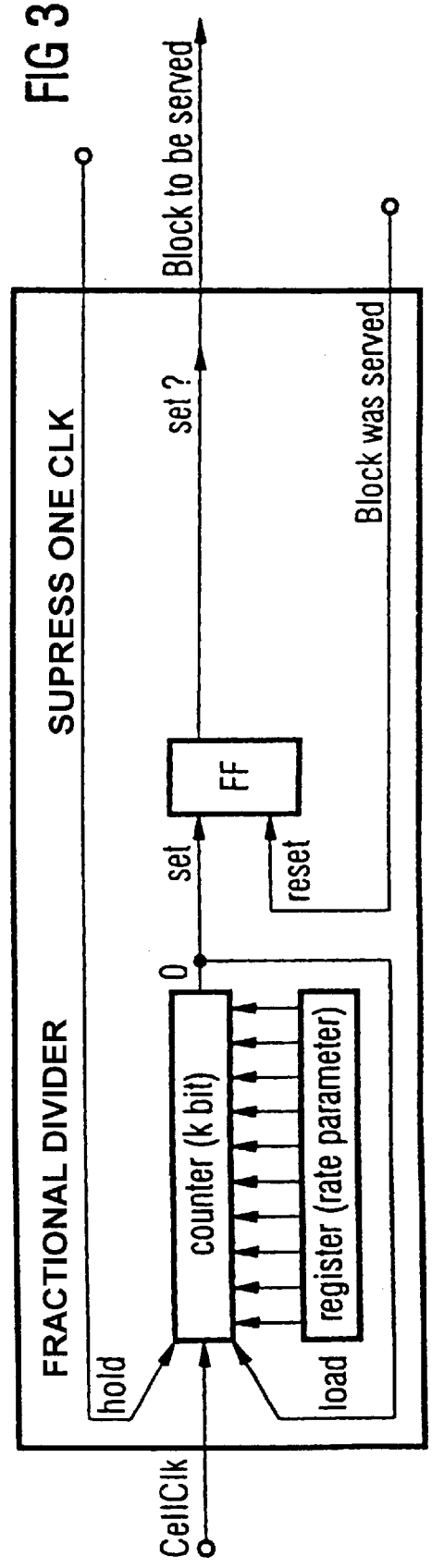

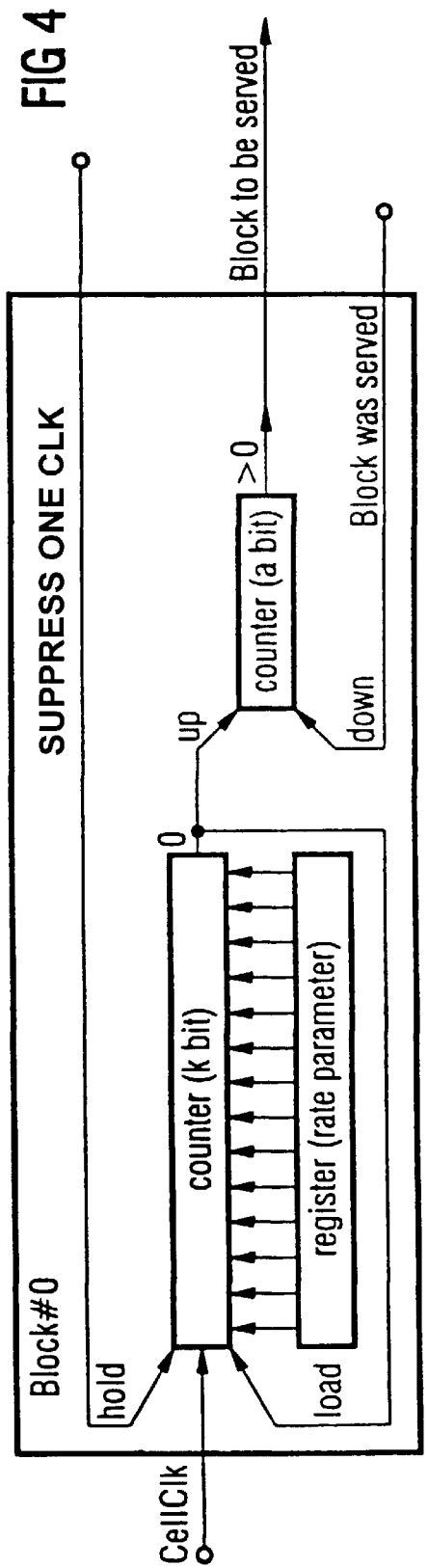
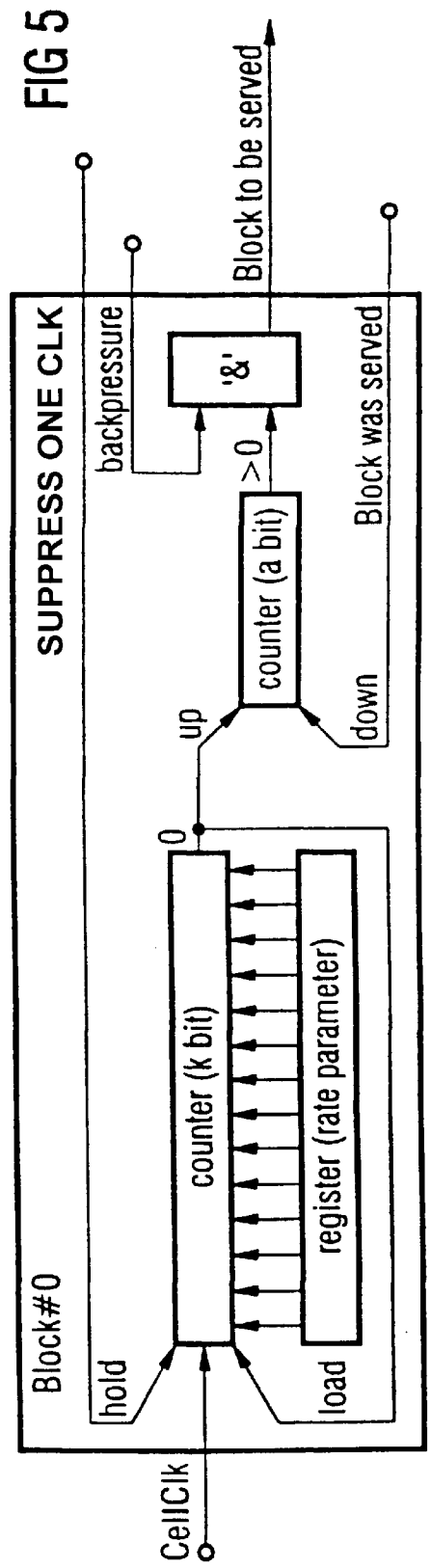

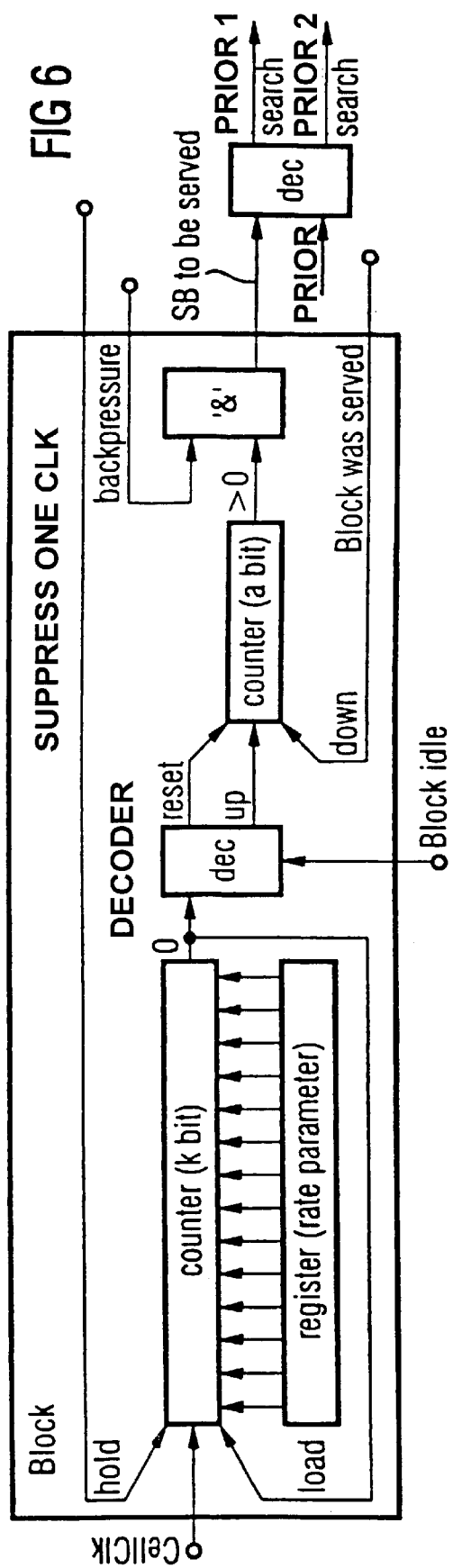

METHOD OF ROUTING ASYNCHRONOUSLY TRANSFERRED MESSAGE CELLS WITH 100% LINE UTILIZATION

FIELD OF THE INVENTION

The subject matter of the present application is directed to a method for routing messages forwarded according to an asynchronous transfer method with 100% line utilization.

DESCRIPTION OF THE RELATED ART

Routing devices that can comprise a plurality of blocks are utilized for matching to the data rates of interfaces. A block may adapt (or shape) the data rate of a virtual path. The data of a plurality of blocks may be supplied to an interface. A standardized interface supports back pressure of traffic. When only one block supplies data to the interface and the data rate set for the block is somewhat higher than the data rate of the interface, a 100% load rate can be achieved for the interface. When the data of a plurality of blocks, i.e. a plurality of virtual paths, are supplied to an interface that supports back pressure of traffic, then a 100% load rate of the line interface is not established.

SUMMARY OF THE INVENTION

The subject matter of the present application is based on the problem of providing a method wherein a load rate of 100% can be achieved for an interface to which a data of several blocks are supplied.

The problem is solved by a method for routing message cells forwarded with an asynchronous transfer method with 100% line utilization, wherein message cells intermediately stored in a plurality of blocks are intended for forwarding via an interface; the sum of the message cell rates declared for the blocks is somewhat higher than the message cell rate of the interface; the interface outputs a back pressure signal when its message cell rate is exceeded; a counter is established for every block; the counters are clocked with a clock signal whose cycle corresponds to a message cell cycle; when reaching a counter reading that corresponds to the message cell rate declared for the appertaining block, a counter outputs an operate signal (or flag) for the forwarding of a message cell; given non-presence of a message cell intended for forwarding, every block outputs an empty signal; an active operate signal is only output for a block when no active back pressure signal and no active empty signal are established; a block exhibits a low priority; and a scheduler block scheduler for each message cell cycle allocates an authorization for forwarding of a message cell to exactly one block based on the criterion of the level of priority of the blocks for which an active operate signal is supplied to the scheduler block scheduler at the moment.

The subject matter of the present application avoids the routing of dummy data for a block that in fact receives an authorization for forwarding data according to the data rate declared for it but does not have any data at the moment. The subject matter of the application yields a complete utilization of the line interface with payload data.

BRIEF DESCRIPTION OF THE DRAWINGS

The subject matter of the present application is described in greater detail below in a scope required for understanding and as an exemplary embodiment on the basis of Figures.

FIG. 1 is a schematic illustration of an arrangement for handling message cells;

FIG. 2 is a block diagram showing further details of the unit referenced SBS in FIG. 1;

FIG. 3 is a block diagram showing further details of the unit referenced FD in FIG. 1;

FIG. 4 is a block diagram showing a further development of the unit FD;

FIG. 5 is a block diagram showing a further development of the unit FD; and

FIG. 6 is a block diagram showing a further development of the unit FD.

DETAILED DESCRIPTION OF THE PREFERRED EMBODIMENTS

Given the routing means of FIG. 1, message cells that are destined for forwarding via an output line OL are intermediately stored organized in blocks SB0 ... SBn, for example 64 blocks, as queues. The message cells exhibit a fixed length and are forwarded according to an asynchronous transfer method, particularly the ATM (asynchronous transfer mode) transfer method, during the course of virtual connections. Let the message cells supplied to a respective block be introduced on an input line IL and be supplied to a respective block in a demultiplexer DMUX according to the criterion of the appertaining, virtual connection. A scheduler block scheduler SBS assigns authorizations to the blocks for forwarding a respective message cell to an interface IF.

The time span $T_{cell}$ during which a forwarded message cell occupies a line defines a message cell cycle. A message cell cycle is equal to a cycle of a message cell clock CClk (standing for cell clock). The scheduler block scheduler SBS determines which block forwards a message cell for each message cell cycle. The scheduler block scheduler SBS comprises a counter FD0 ... FDn for each block. The message cell clock is supplied to the counters at the input side. When they reach a counter reading that corresponds to the message cell rate declared for the appertaining block, the counters output an operate character to a priority encoder PE. Based on the criterion of the priorities allocated to the individual blocks, the priority encoder PE selects a block from the blocks for which an operate character is set at the moment and assigns it an authorization for forwarding a message cell. Let the priority encoder PE search the counters in every message cell cycle for set operate characters according to a mechanism that is referred to in the technical field as round-robin.

The counter according to FIG. 2 should be able to set a predetermined message cell rate. To that end, the message cell clock is divided by a predetermined value with a rate counter (k-bit counter). The size of this divider is predetermined by the minimum message cell rate $R_{min}$ to be set. The rate parameter $T_{serv}=1./.R_{serv}$ is deposited in the register. The rate counter is loaded with $R_{serv}$ and de-increments its counter value by 1 with every message cell cycle. When the counter reading reaches the value 0, the counter is reloaded and a flag is set at the output of a flipflop FF in order to indicate that a message cell can be read from the appertaining block. When a message cell has been read out for this block, this flag is reset. The message cell rate (service rate) derives on the basis of $R_{serv}=1/(T_{serv} \times T_{cell})$.

The step width that can be set, which is also referred to as granularity in the technical field, becomes increasingly coarser (divider ratio 1, 2, 3, 4 ... ) given increasing message cell rates.

Two variables are stored for the fractional divider according to FIG. 3:

$T_{serv}$frac: fractional part of the rate parameter (z bits)

$N_{serv}$frac: momentary sum of the fractional part (z bits)

$T_{serv}$count: integer (numerator) part of the rate parameter (k bits).

$N_{serv}$count: momentary counter reading (k bits).

The calculation of the fractional part ensues either locally in the corresponding block at the respective run-down of the counter or ensues once centrally (variables in tables) respectively given readout from this block.

The algorithm reads as follows:

if ($N_{serv}$count=0/ block was served) then
$N_{serv}$frac=$N_{serv}$frac+$T_{serv}$frac modulo $2^z$
if (overflow of $N_{serv}$frac) then
set Flag 'supressure one clk'

In the next message cell cycle, the flag is reset and the count for this message cell cycle is interrupted.

The rate thus derives as:

$$R_{serv}=1/[(T_{serv}\text{count}+T_{serv}\text{frac})*T_{cell})]$$

$$z=1d[1/(\text{granularity (for example, 1\%)})]$$

All counters run parallel independently of one another. A plurality of counters can run down simultaneously in one message cell cycle. However, only one block can be handled in each message cell cycle, so that counters can also run down repeatedly without having been services. A delay of the message cells derives therefrom (cell delay variation). The declared message cell rate must be adhered to for each block. Given the counter of FIG. 4, the flipflop from FIG. 2 that indicates the flag is replaced by an event counter (a-bit counter). The counter reading of this event counter is incremented by 1 when the rate counter (k-bit counter) runs down. The counter reading of the event counter is lowered by 1 when a message cell was read out for the appertaining block. The event counter can thus assume as many conditions as there are blocks provided in the forwarding means. As long as the counter reading of the event counter is greater than 1, a flag is output to the priority encoder.

Let the interface to which the message cells are forwarded be established by a standardized UTOPIA interface. This interface supports back pressure of traffic. The scheduler block scheduler should be able to react to back pressure signals of the interface, whereby the declared message cell rates should nonetheless be adhered to. A physical interface can have one block (port shaping) or a plurality of blocks (virtual path shaping) allocated to it. In the embodiment of the subject matter of the application according to FIG. 5, the operate signal output by the event counter is logically operated with the back pressure signal of the allocated interface. When the back pressure signal is set, an operate character is not output to the scheduler block scheduler, a forwarding of a message cell being thus suppressed. The execution events, however, are counted in the event counter, so that message cells that were not forwarded during an active back pressure signal are forwarded in the message cell cycles that follow when the activated back pressure signal fails to arrive, the declared message cell rate being thus capable of being adhered to.

The forwarding means allocates message cells to a following interface in such an amount that takes the maximum data rate of the interface into consideration. When the rate with which the forwarding means forwards message cells is set somewhat higher than corresponds to the data rate of the interface, then a 100% traffic load of the interface can be achieved, whereby control is carried out by the back pressure signals.

When virtual connections whose message cells are handled by the scheduler block scheduler are conducted over an interface, a 100% adherence to a traffic capacity of the interface is initially not established.

In the embodiment of FIG. 6, one block is allocated to a virtual path (with the rate of this virtual path) and a separate block is allocated for the remaining rate of the interface. The separate block contains a lower priority in the readout algorithm. At the same time, the blocks are expanded by an indicator "block idle" as to whether an appertaining block contains message cells or is empty. The "block idle" indicator is supplied to a decoder means dec inserted between the rate counter and the event counter. When a rate counter runs down and the appertaining block is empty, then the event counter is reset. Only those blocks are services, thus, that contain message cells, no message cell cycle being thus lost for the forwarding of a message cell.

Although other modifications and changes may be suggested by those skilled in the art, it is the intention of the inventors to embody within the patent warranted hereon all changes and modifications as reasonably and properly come within the scope of their contribution to the art.

What is claimed is:

1. A method for routing message cells forwarded with an asynchronous transfer method with 100% line utilization, comprising the steps of:

storing message cells intermediately in a plurality of blocks, said message cells being intended for forwarding via an interface;

declaring a sum of message cell rates for the blocks to be higher than a message cell rate of the interface;

outputting a back pressure signal from the interface when a message cell rate of the interface is exceeded;

establishing a counter for every block;

clocking the counters with a clock signal whose cycle corresponds to a message cell cycle;

outputting an operate signal from the counter for forwarding a message cell when the counter reaches a counter reading that corresponds to a message cell rate declared for the appertaining block;

outputting an empty signal from every block given nonpresence of a message cell intended for forwarding;

outputting an active operate signal for every block only for those cases when no active back pressure signal together with no active empty signal are established;

assigning a priority to every individual block; and selecting one block from said plurality of blocks for which an operate character is set at a moment based on a criterion of priorities allocated to the individual blocks;

assigning an authorization for forwarding a message cell to the selected block.

* * * * *